(12) United States Patent
Yao et al.

(10) Patent No.: US 11,212,862 B2
(45) Date of Patent: Dec. 28, 2021

(54) METHOD AND SYSTEM FOR CROSS-TECHNOLOGY COMMUNICATION FROM WIFI DEVICE TO ZIGBEE DEVICE

(71) Applicant: SHENZHEN UNIVERSITY, Shenzhen (CN)

(72) Inventors: Junmei Yao, Shenzhen (CN); Kaishun Wu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 17/049,028

(22) PCT Filed: Dec. 27, 2019

(86) PCT No.: PCT/CN2019/129118
§ 371 (c)(1),
(2) Date: Oct. 20, 2020

(87) PCT Pub. No.: WO2021/103255
PCT Pub. Date: Jun. 3, 2021

(65) Prior Publication Data
US 2021/0289577 A1 Sep. 16, 2021

(30) Foreign Application Priority Data
Nov. 28, 2019 (CN) .......................... 201911192592.0

(51) Int. Cl.
*H04W 76/18* (2018.01)
*H04B 17/318* (2015.01)
(Continued)

(52) U.S. Cl.
CPC .......... *H04W 76/18* (2018.02); *H04B 17/318* (2015.01); *H04L 5/0007* (2013.01); *H04L 27/2082* (2013.01); *H04L 69/08* (2013.01)

(58) Field of Classification Search
CPC .... H04W 76/18; H04L 27/2082; H04L 69/08; H04L 5/0007; H04B 17/318
See application file for complete search history.

(56) References Cited

U.S. PATENT DOCUMENTS

2017/0373892 A1* 12/2017 Ganesan .............. H04B 1/0475
2018/0146291 A1* 5/2018 Tabatabai ............... H04R 27/00
(Continued)

FOREIGN PATENT DOCUMENTS

| CN | 107682830 A | 2/2018 |
| CN | 108347439 A | 7/2018 |

(Continued)

OTHER PUBLICATIONS

Junmei Yao, et al., Coordinate Transmissions Centrally: A Cross-Layer Approach for WLANs, 2016.
(Continued)

*Primary Examiner* — Jean B Corrielus
(74) *Attorney, Agent, or Firm* — Bayramoglu Law Offices LLC (57) ABSTRACT

A method and system for cross-technology communication from a WiFi device to a ZigBee device includes: generating, by a WiFi transmitter, to-be-transmitted symbol-level energy modulation bits information simultaneously carrying WiFi data bits and cross-technology data bits transmitted to the ZigBee device, wherein the cross-technology data bits are obtained based on symbol-level energy modulation; and a ZigBee receiver processing received signal strength indication sample information and initiating a cross-technology communication receiving process to obtain the cross-technology data bits needing to be received, and meanwhile a WiFi receiver obtaining the to-be-transmitted symbol-level energy modulation bits information through a standard WiFi receiving process, and then initiating a WiFi data recovery process to obtain original WiFi data bits.

8 Claims, 4 Drawing Sheets

(51) Int. Cl.
*H04L 5/00* (2006.01)
*H04L 27/20* (2006.01)
*H04L 29/06* (2006.01)

(56) References Cited

U.S. PATENT DOCUMENTS

2018/0317127 A1* 11/2018 Chen ............... H04W 4/80
2018/0352055 A1 12/2018 He et al.

FOREIGN PATENT DOCUMENTS

| CN | 109246048 A | 1/2019 |
| CN | 109600771 A | 4/2019 |
| CN | 109617649 A | 4/2019 |

OTHER PUBLICATIONS

Ilenia Tinnirello et al., Cross-Technology WiFi/ZigBee Communications: Dealing With Channel Insertions and Deletions, IEEE Communications Letters, 2016, pp. 2300-2303, vol. 20, No. 11.

Xiuzhen Guo, Cross Technology Communication in Heterogeneous Wireless Networks, 2019.

Ligang Ni et al., Research on Target Detection and Cross-Technology Communication in Smart Lighting Scene, A thesis submitted to Northwest University in partial fulfillment of the requirements for the degree of Master in Software Engineering, 2018, pp. 1-66.

Xiuzhen Guo et al., LEGO-Fi: Transmitter-Transparent CTC with Cross-Demapping, 2019.

Shuai Wang et al., Networking Support For Physical-Layer Cross-Technology Communication, IEEE 26th International Conference on Network Protocols, 2018, pp. 259-269.

Shuai Wang et al., Symbol-level Cross-technology Communication via Payload Encoding, IEEE 38th International Conference on Distributed Computing Systems, 2018, pp. 500-510.

Yongrui Chen et al., TwinBee: Reliable Physical-Layer Cross-Technology Communication with Symbol-Level Coding, IEEE INFOCOM 2018—IEEE Conference on Computer Communications, 2018, pp. 153-161.

Zhijun Li et al., WEBee: Physical-Layer Cross-Technology Communication via Emulation, Paper Session I: Wireless High Jinks, 2017, pp. 2-14.

Xiuzhen Guo et al., WiZig: Cross-Technology Energy Communication over a Noisy Channel, IEEE Conference on Computer Communications, 2017.

* cited by examiner

METHOD AND SYSTEM FOR CROSS-TECHNOLOGY COMMUNICATION FROM WIFI DEVICE TO ZIGBEE DEVICE

CROSS-REFERENCE TO THE RELATED APPLICATIONS

This application is the national stage entry of International Application No. PCT/CN2019/129118, filed on Dec. 27, 2019, which is based upon and claims priority to Chinese Patent Application No. 201911192592.0, filed on Nov. 28, 2019, the entire contents of which are incorporated herein by reference.

TECHNICAL FIELD

The present disclosure relates to the field of communications technologies, and more particularly, to a method and system for cross-technology communication from a WiFi device to a ZigBee device.

BACKGROUND

Reality scenario requirements of heterogeneous node communication exist in the Internet of Things, and this type of communication can be employed to transmit coordination information to achieve more efficient heterogeneous network coexistence, cross-technology communication has become a research focus in recent years. Related research mainly adopts two technical solutions: signal simulation and data packet-level energy modulation.

The signal simulation allows a wireless node to simulate a transmission signal of a heterogeneous node, such that a receiving node demodulates information through the normal process. For example, by modifying an effective load of WiFi data, WEBee can allow a signal transmitted from itself to become a legal ZigBee signal, thereby implementing the communication from WiFi to ZigBee. Due to signal distortion characteristics of the signal simulation mechanism itself, TwinBee and LongBee respectively improve the signal simulation mechanism to improve its reliability and extend its transmission range.

A large number of researchers implement the cross-technology communication through data packet-level energy modulation, mainly using characteristics such as data packet transmission time, packet gap time, and packet transmission time pattern to transfer cross-technology information. Esense proposed the use of energy to transmit information at the earliest. The basic idea is to agree in advance that certain WiFi data packet lengths represent specific cross-technology information at a receiver and a transmitter, wherein the receiver decodes the information according to the duration of the signal energy. C-Morse uses the idea of a Morse code and adopts two different WiFi packet lengths to simulate long codes and short codes to implement 01 encoding for communication from WiFi to ZigBee. FreeBee transmits information to a ZigBee node through time shift characteristics of WiFi periodic beacon frames. Energy-based cross-technology communication is greatly affected by interference, so that WiZig dynamically selects a receiving window width and an energy threshold according to a channel state to achieve more reliable transmission from WiFi to ZigBee. StripComm uses the idea of Manchester encoding and uses a rising edge to represent '0' and a falling edge to represent '1' to counteract the impact of interference in the energy-based cross-technology transmission.

At present, the main problem existing in the signal simulation scheme is failed compatibility with commercial wireless networks. According to the design of WEBee, to allow a signal transmitted by a WiFi node to simulate a ZigBee signal, pilot and null subcarriers of orthogonal frequency division modulation (OFDM) in a WiFi modulation process need to be avoided from using during the cross-technology communication. But in fact, according to the distribution of pilot and null in the WiFi signal, if the node uses a standard WiFi channel and a ZigBee channel, this requirement cannot be met. Therefore, the mechanism of signal simulation can only be implemented when the WiFi node or ZigBee node do not use the standard channels, which is not allowed by the commercial wireless networks.

The data packet-level energy modulation uses one or more WiFi data packets to transmit one or several bits of ZigBee information, which is undoubtedly an inefficient transmission mode. In addition, this mechanism requires a device to transmit data at certain specific time points, which is incompatible with a mode where a Medium Access Control (MAC) layer in a business device uses a random access channel. Therefore, the data packet-level energy modulation is also difficult to be deployed in business networks.

SUMMARY

An objective of the present disclosure is to overcome the defects of the existing technologies by providing a method and system for implementing cross-technology communication based on symbol-level energy modulation. The method is compatible with existing business networks in design of usage channels, physical layers, and MAC layers, and the system can be successfully deployed in business devices.

According to a first aspect of the present disclosure, there is provided a method for cross-technology communication from a WiFi device to a ZigBee device. The method includes:

generating, by a WiFi transmitter, to-be-transmitted symbol-level energy modulation bits information simultaneously carrying WiFi data bits and cross-technology data bits transmitted to the ZigBee device, wherein the cross-technology bits are obtained based on symbol-level energy modulation; and a ZigBee receiver processes received signal strength indication sample information and initiates a cross-technology communication receiving process to obtain the cross-technology data bits needing to be received, and meanwhile a WiFi receiver obtains the symbol-level energy modulation bits information through a standard WiFi receiving process, and then initiates a WiFi data recovery process to obtain original WiFi data bits.

In one embodiment, when the WiFi transmitter simultaneously transmits the cross-technology data bits and the WiFi data bits, two constellation points having the same phase and different amplitudes carry the same WiFi data bits information and different cross-technology data bits information.

In one embodiment, the symbol-level energy modulation bits information is obtained by:

modulating the WiFi data bits to convert the same from serial bits to parallel constellation points, wherein Quadrature Phase Shift Keying (QPSK) is adopted for modulation when a subcarrier is configured to transmit cross-technology information;

further remapping a QPSK constellation point onto a Quadrature Amplitude Modulation (QAM) constellation point; and performing parallel-to-serial conversion and QAM demodulation on all parallel QAM constellation points to obtain the symbol-level energy modulation bits information.

In one embodiment, the remapping a QPSK constellation point onto a QAM constellation point includes:

establishing a mapping relationship between the QPSK constellation point and the QAM constellation point according to an energy requirement of an Orthogonal Frequency Division Multiplexing (OFDM) symbol, wherein the energy requirement of the OFDM symbol is related to the to-be-transmitted cross-technology bits and cross-technology symbol transmission time.

In one embodiment, the ZigBee receiver obtains the cross-technology data bits needing to be received by:

selecting, from a sample set $\{r_i\}$ of the received signal strength indication, a candidate sample set $\{\hat{r}_i^k\}$, wherein k represents an index of the candidate sample set, and i represents an index of a sampling point;

selecting an optimal sample set from the candidate sample sets, wherein the optimal sample set has a largest cumulative received signal strength indication distance compared with other candidate sample sets; and obtaining the cross-technology data bits through energy demodulation.

In one embodiment, the optimal sample set is obtained by:

calculating a mean value of the sample set $\{r_i\}$ of the received signal strength indication, the mean value being expressed as $m_r = \text{mean}(\{r_i\})$; and calculating the cumulative received signal strength indication distance between each of the candidate sample sets $\{\hat{r}_i^k\}$ and the $m_r$, the cumulative received signal strength indication distance being expressed as $$d_{RSSI}^k = \sum_{i=1}^{N} |\hat{r}_i^k - m_r|,$$

the candidate sample set having the largest $d_{RSSI}^k$ being considered as the optimal sample set $\{\overline{r}_i\}$, wherein $i \in [1, N]$, and the N represents the number of samples of the received signal strength indication in the $\{r_i\}$.

In one embodiment, the energy demodulation is carried out by:

a corresponding bit being '1' in response to a value $\overline{r}_i$ of the optimal sample set $\{\overline{r}_i\}$ being greater than a threshold $\beta$, or otherwise the corresponding bit being '0', wherein the $\beta$ represents the mean value $m_r$ of the sample set $\{r_i\}$ of the received signal strength indication.

According to a second aspect of the present disclosure, there is provided a system for cross-technology communication from a WiFi device to a ZigBee device. The system includes a WiFi transmitter, a ZigBee receiver, and a WiFi receiver. The WiFi transmitter generates to-be-transmitted symbol-level energy modulation bits information simultaneously carrying WiFi data bits and cross-technology data bits transmitted to the ZigBee device, and the cross-technology bits are obtained based on symbol-level energy modulation. The ZigBee receiver processes received signal strength indication sample information and initiates a cross-technology communication receiving process to obtain the cross-technology data bits needing to be received, and meanwhile the WiFi receiver obtains the symbol-level energy modulation bits information through a standard WiFi receiving process, and then initiates a WiFi data recovery process to obtain original WiFi data bits.

Compared with the existing technologies, advantages of the method and the system provided by the present disclosure are as follows: the cross-technology communication is implemented through symbol-level energy modulation, the method can be compatible with existing business networks in design of usage channels, physical layers, and MAC layers, and the system can be successfully deployed in business devices.

BRIEF DESCRIPTION OF THE DRAWINGS

The following accompanying drawings are merely used to make exemplary illustration and explanation of the present disclosure, and are not intended to limit the scope of the present disclosure, in which.

In the accompanying drawings, Modulation; Cross-Technology Communication (CTC); Remapping; Demodulation; Symbol; Radio Frequency (RF); Data Bits; Energy Demodulation; and Subcarrier.

DETAILED DESCRIPTION

In order to make the objects, technical solutions, design methods and advantages of the present disclosure more apparent, the present disclosure is further described in detail below with reference to the accompanying drawings and specific embodiments. It is to be understood that the specific embodiments described herein are only intended to explain the present disclosure, and are not restrictive of the present disclosure.

In all examples shown and discussed herein, any specific values should be interpreted as merely exemplary and not limiting. Therefore, other examples of the exemplary embodiment may have different values.

Technologies, methods and devices known to those of ordinary skill in the related art may not be discussed in detail, but where appropriate, the technologies, methods and devices should be considered as part of the specification.

The method and the system provided by the present disclosure may be applied to the communication from a WiFi device to a ZigBee device, and cross-technology transmission is implemented mainly through two mechanisms, i.e., symbol-level energy modulation and parallel data transmission, so as to be compatible with existing business devices.

1) Introduction to the Symbol-Level Energy Modulation

Figure 1A:
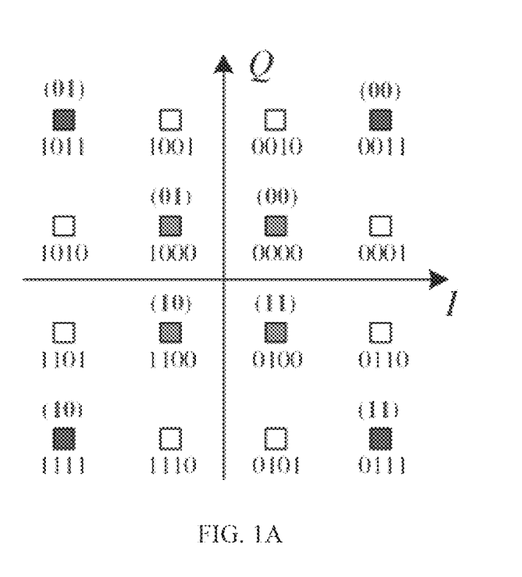
FIG. 1A and FIG. 1B are schematic diagrams of symbol-level energy modulation.
Figure 1B:
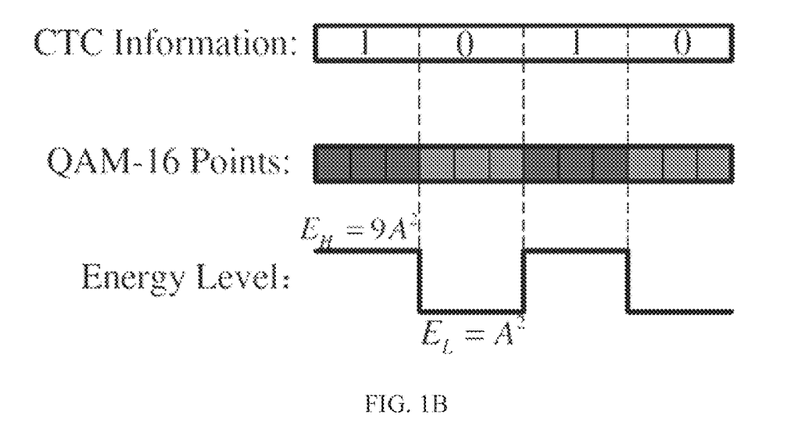

In the transmission process of a WiFi signal, original bits are first mapped onto constellation points by a Quadrature Amplitude Modulation (QAM) module to form symbols, then the signal is further multiplexed by an Orthogonal Frequency Division Multiplexing (OFDM) module, and finally, the signal is converted into an analog signal, which is transmitted by a radio frequency (RF) module. The QAM modulation may be regarded as a combination of amplitude modulation and phase modulation. Referring to the QAM-16 constellation points as shown in FIG. 1A and FIG. 1B, there are 16 constellation points in total, and each constellation point represents Q=log 2(16)=4 data bits. As can be seen intuitively from FIG. 1, four constellation points marked as 1011, 0011, 1111 and 0111 have three times of signal amplitude difference and nine times of energy difference compared with four constellation points marked as 1000, 0000, 1100 and 0100. In the present disclosure, this characteristic is utilized, and the symbol-level energy modulation is performed on a cross-technology transmission signal in a WiFi data packet, such that the cross-technology bit '0' is transmitted with low-amplitude symbols (such as 1000, 0000, 1100 and 0100), and the bit '1' is transmitted with high-amplitude symbols (such as 1011, 0011, 1111, and 0111). In this way, an efficient cross-technology communication mechanism from a WiFi node to a ZigBee node is implemented.

2) Introduction to the Parallel Data Transmission

While transmission of cross-technology information is implemented using the symbol-level energy modulation, in the present disclosure, a WiFi transmitter and receiver signal processing module is additionally provided, such that WiFi data can be transmitted in parallel with the cross-technology information, thereby improving overall network performance. In fact, as can be seen from the QAM constellation points, the QAM modulation has characteristics of amplitude modulation and phase modulation. As shown in FIG. 1A, the QAM-16 constellation points include two groups of Quadrature Phase Shift Keying (QPSK) constellation points, which respectively corresponds to the four constellation points 1011, 0011, 1111 and 0111 and the four constellation points 1000, 0000, 1100 and 0100. According to the encoding mode provided by the present disclosure, when transmitting the cross-technology information, the WiFi transmitter may allow two constellation points with the same phase and different amplitudes to represent the same data bits. As shown in FIG. 1A and FIG. 1B, both the two constellation points 0011 and 0000 in the first quadrant correspond to the data bit '00'.

Figure 2:
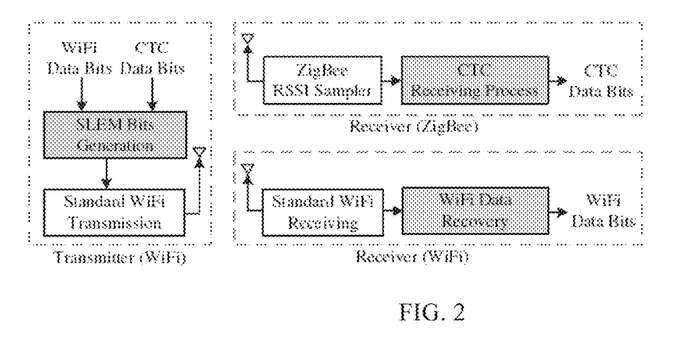
FIG. 2 is a frame diagram of a system for cross-technology communication according to an embodiment of the present disclosure.

FIG. 2 is a frame diagram of a system for cross-technology communication according to an embodiment of the present disclosure, which illustrates a basic processing flow from a WiFi transmitter to a ZigBee receiver and a WiFi receiver. The WiFi transmitter includes an SLEM bits generation module, and a standard WiFi transmission module. The WiFi receiver includes a standard WiFi receiving module, and a WiFi data recovery module. The ZigBee receiver includes a ZigBee RSSI sampler and a CTC receiving process module. Compared with the existing technologies, the SLEM bits generation module, the CTC receiving process module and the WiFi data recovery module are new modules of the present disclosure.

Specifically, the WiFi transmitter first generates to-be-transmitted bits information according to the WiFi data bits and the cross-technology data bits, which are referred to as Symbol Level Energy Modulation (SLEM) bits herein. The SLEM bits may be transmitted as payloads of the WiFi data packet after being processed in a WiFi standard transmission process.

After receiving this information, the ZigBee receiver first obtains the Received Signal Strength Indication (RSSI) sample information, and then initiates a cross-technology communication receiving process to obtain the cross-technology data bits needing to be received. In the meanwhile, the WiFi receiver firstly obtains the SLEM bits information through the standard WiFi receiving process, and then initiates the WiFi data recovery module to obtain the original WiFi data bits.

Designs of the WiFi transmitter, the ZigBee receiver and the WiFi receiver of the present disclosure are specifically introduced below.

1) The Design of the WiFi Transmitter

The main objective of designing the WiFi transmitter is to generate to-be-transmitted SLEM bits based on the WiFi data bits and the cross-technology data bits, such that when a signal is transmitted, the signal may carry both WiFi information and Zigbee information.

In the business devices, the standard WiFi signal transmission process is as follows: the to-be-transmitted WiFi data bits are first mapped as complex symbols by the QAM modulation module, and then are mapped onto an OFDM subcarrier based on serial-to-parallel (S/P) conversion, and are further converted from frequency-domain signals to time-domain signals by Inverse Fast Fourier Transform (IFFT) and then are converted to parallel signals by a P/S module, and finally, for each OFDM symbol, after inserting cyclic prefix (CP), the parallel signals are transmitted via a radio frequency from end.

Figure 3:
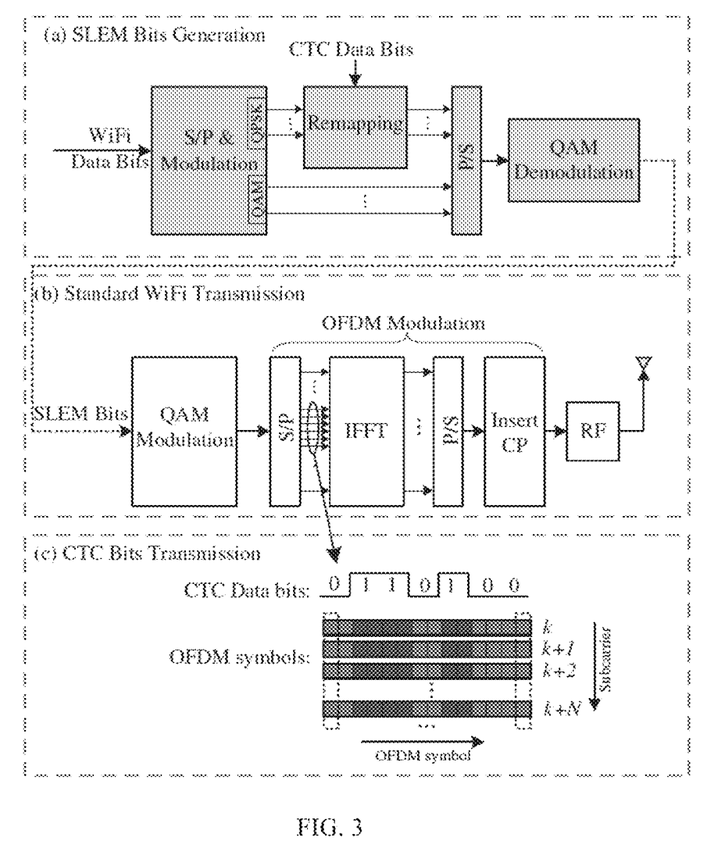
FIG. 3 is a schematic diagram of a WiFi transmitter according to an embodiment of the present disclosure.

On the basis of the existing business devices, a generation process of the SLEM bits designed in the present disclosure is as shown in FIG. 3. The transmitter first modulates the WiFi data bits to converts them from serial bits to parallel constellation points, where the modulation mode is related to the No. of a subcarrier. QPSK is used for modulation if the subcarrier is configured to transmit the cross-technology information, or the QAM modulation mode is adopted if the subcarrier is not configured to transmit the cross-technology information. For the cross-technology information, the QPSK constellation points need to be further remapped onto the QAM constellation points, and the mapping results are related to the to-be-transmitted cross-technology bits. The SLEM bits may be generated after all the parallel QAM constellation points are finally subjected to the parallel-to-serial (P/S) conversion and the QAM demodulation.

A mapping table needs to be established first in order to remap the QPSK constellation points onto the QAM constellation points for carrying both WiFi data bits information and cross-technology bits information. Referring to FIG. 1A and FIG. 1B, if the energy requirement of the OFDM symbol is low, the QPSK constellation point '00' will be mapped to the QAM-16 constellation point '0000'. Otherwise, if the energy requirement of the OFDM symbol is high, the QPSK constellation point '00' will be mapped to the constellation point '0011'. As can be seen from FIG. 3 (Part c), low or high energy of the OFDM symbol is determined by two factors, i.e., the to-be-transmitted cross-technology bits and the cross-technology symbol transmission time $\tau_{CTC}$. Since the duration of one OFDM symbol is $\tau_{OFDM}=4$ μs, the number of OFDM symbols required to transmit one cross-technology bit is $$N_s = \frac{\tau_{CTC}}{\tau_{OFDM}},$$

where a value of the $\tau_{CTC}$ is determined by the RSSI sampling accuracy of the ZigBee end.

It is to be noted that although the above description takes QAM-16 as an example, the specific design can seamlessly support higher-order QAM modulation modes, such as QAM-64 and QAM-256 recommended according to the standards. A specific process is similar to QAM-16, and four lowest-energy constellation points and four highest-energy constellation points may also be selected for transmission of the cross-technology bits information.

2) The Design of the ZigBee Receiver

Figure 4:
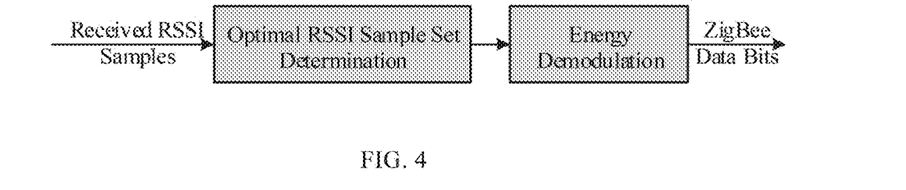
FIG. 4 is a schematic diagram of a ZigBee receiver according to an embodiment of the present disclosure.

In the present disclosure, an additional module is added to the ZigBee receiver, such that the ZigBee receiver can obtain the cross-technology bits information through energy demodulation. The specific process is as shown in FIG. 4, the receiver first obtains the optimal RSSI sample set from all received RSSI samples, and then obtains the cross-technology bits information through the energy demodulation module.

(1) Obtaining the Optimal RSSI Sample Set

Figure 5:
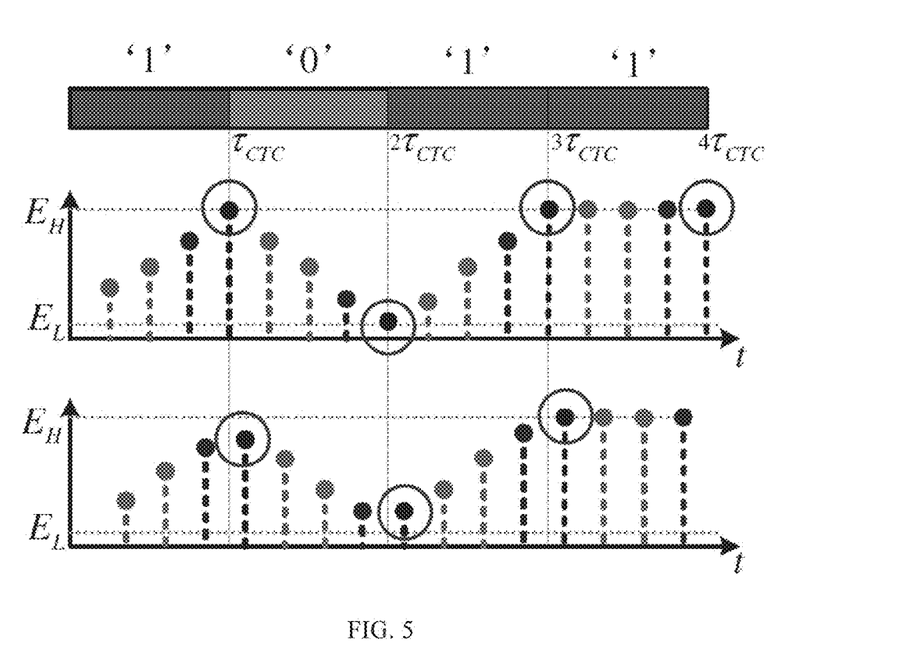
FIG. 5 is a schematic diagram of an RSSI sample example of the ZigBee receiver according to an embodiment of the present disclosure.

FIG. 5 respectively illustrates, from top to bottom, RSSI values in transmission of CTC symbols when sampling at the boundaries of the CTC symbols and when not sampling at the boundaries of the CTC symbols. The duration $\tau_{CTC}$ of a cross-technology symbol is generally greater than an RSSI sampling interval $\tau_s$ of the ZigBee receiver, and an RSSI value of the receiver is generally an average value of the energy of the received signal within calculated time $T_s$ (taking a widely used sensor node TelosB as an example, $T_s$=128 μs, $\tau_s$=32 μs). Therefore, even in the same cross-technology symbol, values of each RSSI sampling point are different. As shown in FIG. 5, the RSSI sample sets indicated by circles can more accurately reflect energy values of the cross-technology symbols, and this RSSI sample set is referred to as the optimal RSSI sample set. This process may be completed in two parts: the receiver first obtains candidate sample sets from the received RSSI sample sets $\{r_i\}$, and then selects the optimal one from theses candidate sample sets.

The candidate sample set is defined as $\{\hat{r}_i^k\}$ (wherein k represents a candidate set index), which may be obtained from the $\{r_i\}$. For example, values are selected from $\{r_i\}$ at different starting positions at an interval of $$N_{intv} = \frac{\tau_{CTC}}{\tau_s}.$$

As shown in FIG. 5, RSSI sampling points of the same color belong to the same candidate sample set. At this moment, $\tau_{CTC}$=128 μs and $\tau_s$=32 μs, there are a total of $N_{intv}$=4 candidate sample sets, corresponding to different colors in FIG. 5.

Further, the ZigBee receiver selects, from the candidate sample sets, the optimal sample set, i.e., the group identified by the circle in FIG. 5. As can be seen from FIG. 5, compared with the other candidate sample sets, the optimal sample set has the largest cumulative RSSI distance, that is, the distance between the largest RSSI and the smallest RSSI. Based on this characteristic, in one embodiment, the process of determining the optimal sample set in the present disclosure is as follows: the mean value of all received RSSI samples $\{r_i\}$ is first calculated, which is expressed as $m_r$=mean($\{r_i\}$); for each candidate sample set $\{\hat{r}_i^k\}$ (k∈[1, $N_{intv}$], i∈[1,N], the N represents the number of the RSSI samples in the $\{r_i\}$), the cumulative RSSI distance between the candidate sample set and the $m_r$ is $$d_{RSSI}^k = \sum_{i=1}^{N} |\hat{r}_i^k - m_r|;$$

and the $k^{th}$ candidate sample set having the largest $d_{RSSI}^k$ is determined as the optimal sample set, which is marked as $\{\bar{r}_i\}$ herein.

(2) Energy Demodulation

After obtaining the optimal sample set $\{\bar{r}_i\}$, the ZigBee node may obtain the cross-technology bits information through energy demodulation. For example, the demodulation process is as follows: the corresponding bit is '1' if the $\bar{r}_i$ is greater than a certain threshold β, or otherwise the corresponding bit is '0'.

The threshold β may be a fixed value or a non-fixed value. Preferably, the received RSSI sample value may change with factors such as a transmission power or a distance between the transmitter and the receiver, so the threshold β is set as a non-fixed value. For example, the mean value $m_r$ of the $\{r_i\}$ is selected as the non-fixed value. Considering $r_i$=$x_i$+$n_i$ (wherein the $x_i$ represents a transmitted signal, and the $n_i$ represents background noise with a fixed mean), it is obvious that the $m_r$ can reflect the dynamic change of the received energy with the transmission power and the background noise.

3) The Design of the WiFi Receiver

After receiving a signal, the WiFi receiver first executes the standard WiFi receiving process to obtain the SLEM bits, and then executes a recovery mechanism to obtain the original WiFi data bits.

Figure 6:
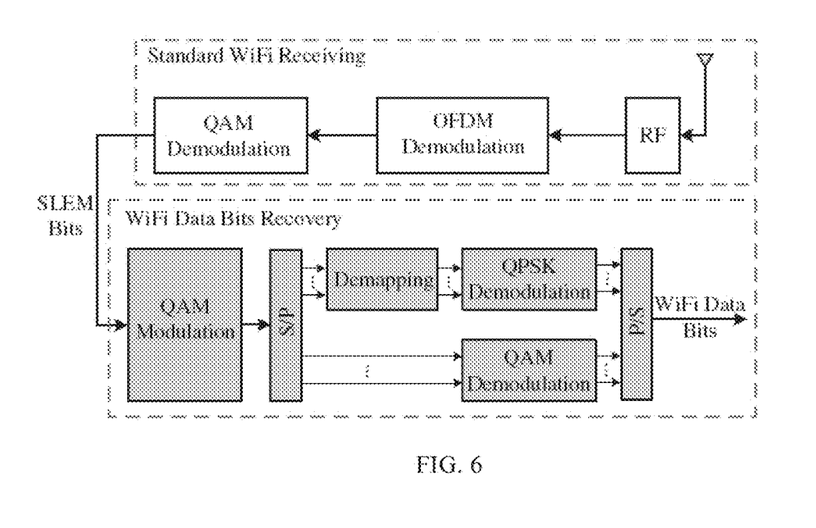
FIG. 6 is a processing flow of a WiFi receiver according to an embodiment of the present disclosure.

As shown in FIG. 6, according to the standard process, the received signal may first be subjected to the OFDM demodulation and the QAM demodulation to recover the SLEM bits. It is to be noted that the order of QAM may be QAM-16 or QAM-64, etc., which may be obtained from a RATE field of the received signal. A value of this field is filled in by the transmitter according to the order of the QAM modulation. The receiver performs the QAM demodulation according to the modulation order.

The process of recovery the SLEM bits from the original WiFi data bits basically may be regarded as an inverse process of the transmitter, which is specifically as shown in FIG. 6. The SLEM bits may first be demapped onto the QAM constellation points by the demapping module, and then may be changed into parallel signals by S/P. The QAM constellation points on the subcarrier for cross-technology communication may be remapped as the QPSK constellation points, and the data bits are obtained by the QPSK demodulation. The constellation points on other subcarriers are subjected to the QAM demodulated to obtain the data bits. After the data bits on all subcarriers are converted into the serial signals by P/S, the original WiFi data bits are obtained.

The demapping module for demapping needs to map the QAM constellation points as the QPSK constellation points, which is an inverse process of remapping: a mapping table is first established, as shown in FIG. 1, both the QAM-16 constellation points '0000' and '0011' are mapped as the QPSK constellation point '00'.

Figure 7A:
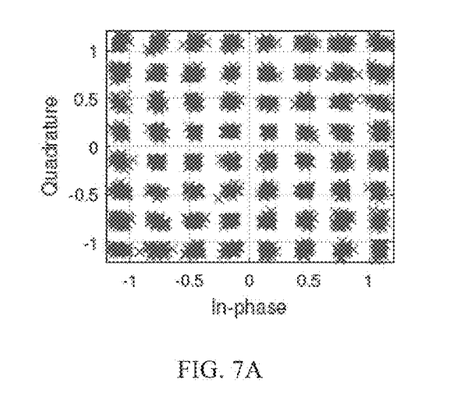
FIG. 7A and FIG. 7B are schematic diagrams of QAM-64 constellation points of a WiFi receiver according to an embodiment of the present disclosure.
Figure 7B:
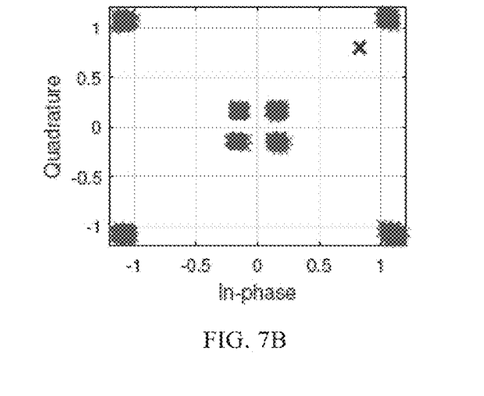

Further, the present disclosure proposes a soft mapping scheme to improve WiFi transmission performance. Referring to a standard WiFi signal in FIG. 7A and an SLEM signal in FIG. 7B, in the subcarrier for transmission of the cross-technology information, the number of constellation points is only 8, which is much smaller than the number of constellation points in normal WiFi transmission. At this moment, some errors may be corrected. After the QAM modulation, if a certain constellation point is not one of the 8 constellation points (as shown by a cross mark in FIG. 7B), the receiver may calculate distances from this constellation point to the 8 constellation points, and select a constellation point closest to this constellation point as a corrected constellation point. In this way, the constellation point indicated by the cross mark in FIG. 7B may be corrected as the constellation point in the upper right corner.

In conclusion, the present disclosure implements the cross-technology communication from WiFi to ZigBee based on the symbol-level energy modulation, and carries information of a plurality of cross-technology bits in one WiFi data packet based on fine adjustment of symbol energy by utilizing phase modulation characteristics of the QAM modulation in the WiFi standard transmission process. In addition, in the present disclosure, while the transmission of the cross-technology information is implemented by using the symbol-level energy modulation, a WiFi transmitter and receiver signal processing module is additionally provided, such that the WiFi data can be transmitted in parallel with the cross-technology information.

Verifications carried out on a USRP software-based radio platform and a TelosB sensor platform proves that the method of the present disclosure can be compatible with the existing business networks and the system of the present disclosure can be easily deployed in business devices.

It is to be noted that although the steps are described in a specific order above, it does not mean that the steps must be executed in the specific order mentioned above. In fact, some of these steps can be executed concurrently, or even the order can be changed, as long as required functionalities can be implemented.

The descriptions of the various embodiments of the present disclosure have been presented above for purposes of illustration, but are not intended to be exhaustive or limited to the embodiments disclosed. Therefore, it is apparent to an ordinary skilled person in the art that modifications and variations could be made without departing from the scope and spirit of the embodiments. The terminology used herein is chosen to best explain the principles of the embodiments, the practical application or technical improvement over technologies found in the marketplace, or to enable others of ordinary skill in the art to understand the embodiments disclosed herein.

What is claimed is:

1. A method for cross-technology communication from a WiFi device to a ZigBee device, comprising steps of:
   generating, by a WiFi transmitter, to-be-transmitted symbol-level energy modulation bits information simultaneously carrying WiFi data bits and cross-technology data bits transmitted to the ZigBee device, wherein the cross-technology data bits are obtained based on symbol-level energy modulation; and
   processing, by a ZigBee receiver, received signal strength indication sample information and initiating a cross-technology communication receiving process to obtain the cross-technology data bits needing to be received, and
   obtaining, by a WiFi receiver, the to-be-transmitted symbol-level energy modulation bits information through a standard WiFi receiving process, and then initiating a WiFi data recovery process to obtain original WiFi data bits.

2. The method according to claim 1, wherein when the WiFi transmitter simultaneously transmits the cross-technology data bits and the WiFi data bits, two constellation points having a same phase and different amplitudes carry same WiFi data bits information and different cross-technology data bits information.

3. The method according to claim 1, wherein the to-be-transmitted symbol-level energy modulation bits information is obtained by:
   modulating the WiFi data bits to convert the WiFi data bits from serial bits to parallel constellation points, wherein quadrature phase shift keying is adopted for modulation when a subcarrier is configured to transmit cross-technology information;
   remapping a quadrature phase shift keying constellation point onto a quadrature amplitude modulation constellation point; and
   performing parallel-to-serial conversion and quadrature amplitude modulation demodulation on all parallel quadrature amplitude modulation constellation points to obtain the to-be-transmitted symbol-level energy modulation bits information.

4. The method according to claim 3, wherein the step of remapping the quadrature phase shift keying constellation point onto the quadrature amplitude modulation constellation point comprises steps of:
   establishing a mapping relationship between the quadrature phase shift keying constellation point and the quadrature amplitude modulation constellation point according to an energy requirement of orthogonal frequency division multiplexing symbol, wherein the energy requirement of the orthogonal frequency division multiplexing OFDM symbol is related to the to-be-transmitted cross-technology data bits and cross-technology symbol transmission time.

5. The method according to claim 1, wherein the ZigBee receiver obtains the cross-technology data bits needing to be received by:
   selecting, from a sample set $\{r_i\}$ of the received signal strength indication sample information, a candidate sample set $\{\hat{r}_i^k\}$, wherein k represents an index of the candidate sample set, and i represents an index of a sampling point;
   selecting an optimal sample set from the candidate sample sets, wherein the optimal sample set has a largest cumulative received signal strength indication distance compared with other candidate sample sets; and
   obtaining the cross-technology data bits through energy demodulation.

6. The method according to claim 5, wherein the optimal sample set is obtained by:
   calculating a mean value of the sample set $\{r_i\}$ of the received signal strength indication sample information, the mean value being expressed as $m_r = \text{mean}(\{r_i\})$; and
   calculating a cumulative received signal strength indication distance between each of the candidate sample sets $\{\hat{r}_i^k\}$ and the $m_r$, the cumulative received signal strength indication distance being expressed as $$d_{RSSI}^k = \sum_{i=1}^{N} |\hat{r}_i^k - m_r|,$$

the candidate sample set having the largest cumulative received signal strength indication distance $d_{RSSI}^{k}$ being considered as the optimal sample set $\{\overline{r_i}\}$, wherein i∈[1,N], and the N represents the number of samples of the received signal strength indication sample information in the $\{r_i\}$.

7. The method according to claim 6, wherein the energy demodulation is carried out by:
a corresponding bit being '1' in response to a value $\overline{r_i}$ of the optimal sample set $\{\overline{r_i}\}$ being greater than a threshold β, and the corresponding bit being '0' in response to the value $\overline{r_i}$ of the optimal sample set $\{\overline{r_i}\}$ being equal to or less than the threshold β, wherein the β represents the mean value $m_r$ of the sample set $\{r_i\}$ of the received signal strength indication sample information.

8. A system for cross-technology communication from a WiFi device to a ZigBee device, comprising a WiFi transmitter, a ZigBee receiver, and a WiFi receiver, wherein the WiFi transmitter generates to-be-transmitted symbol-level energy modulation bits information simultaneously carrying WiFi data bits and cross-technology data bits transmitted to the ZigBee device, and the cross-technology data bits are obtained based on symbol-level energy modulation; and the ZigBee receiver processes received signal strength indication sample information and initiates a cross-technology communication receiving process to obtain the cross-technology data bits needing to be received, and the WiFi receiver obtains the to-be-transmitted symbol-level energy modulation bits information through a standard WiFi receiving process, and then initiates a WiFi data recovery process to obtain original WiFi data bits.

\* \* \* \* \*